(12) United States Patent  
Oikawa

(10) Patent No.: US 9,030,458 B2  
(45) Date of Patent: May 12, 2015

(54) ELECTRO-OPTICAL DEVICE AND ELECTRONIC APPARATUS

(71) Applicant: Seiko Epson Corporation, Tokyo (JP)

(72) Inventor: Hiroyuki Oikawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/323,232

(22) Filed: Jul. 3, 2014

(65) Prior Publication Data

US 2014/0313179 A1    Oct. 23, 2014

Related U.S. Application Data

(63) Continuation of application No. 13/614,422, filed on Sep. 13, 2012, now Pat. No. 8,803,867.

(30) Foreign Application Priority Data

Sep. 28, 2011    (JP) ................ 2011-2512184

(51) Int. Cl.
  *G09G 3/36*    (2006.01)
  *G02F 1/1345*    (2006.01)
  *G09G 3/20*    (2006.01)

(52) U.S. Cl.
  CPC .. *G09G 3/36* (2013.01); *G09G 3/20* (2013.01); *G09G 2330/04* (2013.01); *G02F 1/1345* (2013.01); *G02F 1/13454* (2013.01); *G02F 2001/13456* (2013.01)

(58) Field of Classification Search
  CPC ............ G09G 2330/021; G09G 2330/04; G09G 2330/06; G09G 2300/0426
  USPC ........................................ 345/211
  See application file for complete search history.

(56) References Cited

U.S. PATENT DOCUMENTS

| 7,742,023 | B2 | 6/2010 | Matsumoto | |
|---|---|---|---|---|
| 8,149,230 | B2 | 4/2012 | Lee et al. | |
| 8,803,867 | B2 * | 8/2014 | Oikawa | 345/211 |
| 2003/0141811 | A1 * | 7/2003 | Park et al. | 313/506 |
| 2005/0162605 | A1 | 7/2005 | Murade | |
| 2006/0267913 | A1 | 11/2006 | Mochizuki et al. | |
| 2008/0266506 | A1 | 10/2008 | Takenaka et al. | |

FOREIGN PATENT DOCUMENTS

| JP | 2007-65157 A | 3/2007 |
|---|---|---|
| JP | 2007-206594 A | 8/2007 |
| JP | 2007-272162 A | 10/2007 |
| JP | 2008-70896 A | 3/2008 |
| JP | 2008-275818 A | 11/2008 |

OTHER PUBLICATIONS

Notice of Allowance and Notice of Allowability received in U.S. Appl. No. 13/614,422; Apr. 2, 2014.

* cited by examiner

*Primary Examiner* — Kevin Nguyen
(74) *Attorney, Agent, or Firm* — ALG Intellectual Property, LLC

(57) ABSTRACT

A liquid crystal device includes a scanning line driving circuit, a data line driving circuit, a first VDD power supply wiring line that supplies power to the data line driving circuit, a second VDD power supply wiring line that supplies power to the scanning line driving circuit, and a common wiring line that electrically connects the first VDD power supply wiring line and the second VDD power supply wiring line to each other in an integrated manner. The common wiring line includes electrical conductors, a wiring line, and contact holes.

6 Claims, 5 Drawing Sheets

ELECTRO-OPTICAL DEVICE AND ELECTRONIC APPARATUS

CROSS-REFERENCE

The present application is a continuation application of U.S. patent application Ser. No. 13/614,422 filed on Sep. 13, 2012 which claims priority from Japanese Patent Application No. 2011-212184 filed on Sep. 28, 2011, which are hereby expressly incorporated by reference in their entirety.

BACKGROUND

1. Technical Field

The present invention relates to an electro-optical device and an electronic apparatus.

2. Related Art

An active drive type liquid crystal device that includes transistors, which serve as elements for controlling switching of pixel electrodes, corresponding to pixels is a known example of an electro-optical device. In the liquid crystal device, for example, due to static electricity generated in a manufacturing process, excessive voltage may be applied to transistors and wiring lines provided in peripheral circuitry (specifically, circuitry such as a data line driving circuit and a scanning line driving circuit which are connected to a power source), and thereby electrostatic damage is caused.

JP-A-2007-65157, for example, discloses a technique in which a power supply wiring line for a data line driving circuit and a power supply wiring line for a scanning line driving circuit are connected to each other in an integrated manner using a common wiring line, thereby preventing transistors, wiring lines, etc. from being damaged by static electricity generated in a manufacturing process or the like.

In the technique disclosed in JP-A-2007-65157, however, because the common wiring line is disposed on a layer that is above a layer on which the transistors, the wiring lines, and so forth are provided, and is connected to them, when patterning of the wiring lines and so forth is performed, the power supply wiring lines have not yet been connected to each other in an integrated manner. Hence, if static electricity is generated when the patterning is performed, because there are no paths to let the static electricity escape, electric charges are concentrated in the transistors, the wiring lines, etc. and thereby damage them.

SUMMARY

The invention may be implemented as the following aspects or application examples.

Application Example 1

An electro-optical device according to an application example includes a data line driving circuit, a scanning line driving circuit, a first power supply wiring line that supplies power to the data line driving circuit, a second power supply wiring line that supplies power to the scanning line driving circuit, a wiring line that electrically connects the first power supply wiring line and the second power supply wiring line to each other, a first electrical conductor that electrically connects the first power supply wiring line and the wiring line to each other, and a second electrical conductor that electrically connects the second power supply wiring line and the wiring line to each other.

According to this structure, the first power supply wiring line and the second power supply wiring line are electrically connected to each other in an integrated manner via the first electrical conductor, the second electrical conductor, and the wiring line. (Alternatively, portions serving as the first power supply wiring line and the second power supply wiring line are electrically connected to each other in an integrated manner.) Thus, even if static electricity is generated when patterning of transistors, wiring lines, and so forth which are connected to the data line driving circuit and the scanning line driving circuit is performed, because the power supply wiring lines are redundantly routed through the electrical conductors and the wiring line, the static electricity may be prevented from being concentrated in a portion. Hence, the amount of static electricity is reduced, so that electrostatic damage of the transistors and the wiring lines, which are connected to the power supply wiring lines to which power is supplied, may be suppressed. In addition, the electrical conductors may be used as inrush resistors and thereby may consume electric charges.

Application Example 2

The electro-optical device according to the application example may further include a first insulating film that is provided between a layer on which the first power supply wiring line and the second power supply wiring line are provided and a layer on which the first electrical conductor and the second electrical conductor are provided, and a second insulating film that is provided between the layer on which the first electrical conductor and the second electrical conductor are provided and a layer on which the wiring line is provided. It is preferable that the first electrical conductor and the second electrical conductor be provided between the layer on which the first power supply wiring line and the second power supply wiring line are provided and the layer on which the wiring line is provided.

According to this structure, because the power supply wiring lines and the wiring line are spaced apart from each other by and also are redundantly routed through the first electrical conductor and the second electrical conductor, which are provided between the first insulating film and the second insulating film, static electricity may be prevented from being concentrated in a portion. Hence, the amount of static electricity is reduced, so that electrostatic damage of the transistors and the wiring lines, which are connected to the power supply wiring lines to which power is supplied, may be suppressed.

Application Example 3

In the electro-optical device according to the application example, it is preferable that the first power supply wiring line and the first electrical conductor be connected to each other via a first contact hole which is provided in the first insulating film, the second power supply wiring line and the second electrical conductor be connected to each other via the first contact hole, and the first electrical conductor and the second electrical conductor be connected to the wiring line via a second contact hole which is provided in the second insulating film.

According to this structure, because the power supply wiring lines, the electrical conductors, and the wiring line are spaced apart from one another by and also are redundantly routed through the first contact hole and the second contact hole, static electricity may be prevented from being concentrated in a portion. Hence, the amount of static electricity is reduced, so that electrostatic damage of the transistors and the wiring lines, which are connected to the power supply wiring lines to which power is supplied, may be suppressed.

Application Example 4

In the electro-optical device according to the application example, it is preferable that connection resistance of the second contact hole be higher than that of the first contact hole.

According to this structure, because the connection resistance of the second contact hole which is close to the wiring line is higher, the amount of static electricity (electric charge) may be reduced before static electricity (electric charge) flows to the wiring line. Hence, the transistors and the wiring lines, which are connected to the power supply wiring lines, may be protected from the static electricity.

Application Example 5

In the electro-optical device according to the application example, it is preferable that the first electrical conductor and the second electrical conductor be provided in the same film as a gate electrode.

According to this structure, because the electrical conductors are provided on the same layer as the gate electrode, for example, the wiring line is provided on the layer below the electrical conductors, metal wiring lines (first power supply wiring line and second power supply wiring line) are provided on the layer above the gate electrode, and the distance between the wiring line and the metal wiring lines, which are connected to each other via the electrical conductors, may be increased. Hence, the wiring lines may be prevented from intersecting at a close distance, and electrostatic damage of the wiring lines, the transistors, and so forth may be suppressed.

Application Example 6

The electro-optical device according to the application example may further include transistors that are provided so as to correspond to a plurality of pixel portions and a light shielding film that shields the transistors from light. It is preferable that the wiring line be provided in the same film as the light shielding film.

According to this structure, because the wiring line is provided on the same layer as the light shielding film, for example, the wiring line is provided on the layer below the electrical conductors, the metal wiring lines (first power supply wiring line and second power supply wiring line) are provided on the layer above the gate electrode, and the distance between the wiring line and the metal wiring lines, which are connected to each other via the electrical conductors, may be increased. Hence, the wiring lines may be prevented from intersecting at a close distance, and electrostatic damage of the wiring lines, the transistors, and so forth may be suppressed.

Application Example 7

In the electro-optical device according to the application example, it is preferable that the first power supply wiring line and the second power supply wiring line be formed of the same film as a data line.

According to this structure, the first power supply wiring line and the second power supply wiring line are provided in the same film as the data line. Hence, even if static electricity is generated when patterning of the first power supply wiring line and the second power supply wiring line is performed, electric charges may be caused to pass through the electrical conductors and the wiring line by previously connecting the power supply wiring lines to each other in an integrated manner by the electrical conductors and the wiring line, which are disposed on the layers below the power supply wiring lines. As a result, the transistors and the wiring lines, which are connected to the power supply wiring lines, may be protected from the static electricity.

Application Example 8

An electronic apparatus according to the application example includes the foregoing electro-optical device.

According to this structure, because the electronic apparatus includes the foregoing electro-optical device, the transistors and the wiring lines, which are connected to the power supply wiring lines provided in peripheral circuitry, may be protected from static electricity, so that the electronic apparatus that allows improvement in the reliability and the yield thereof to be achieved may be provided.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
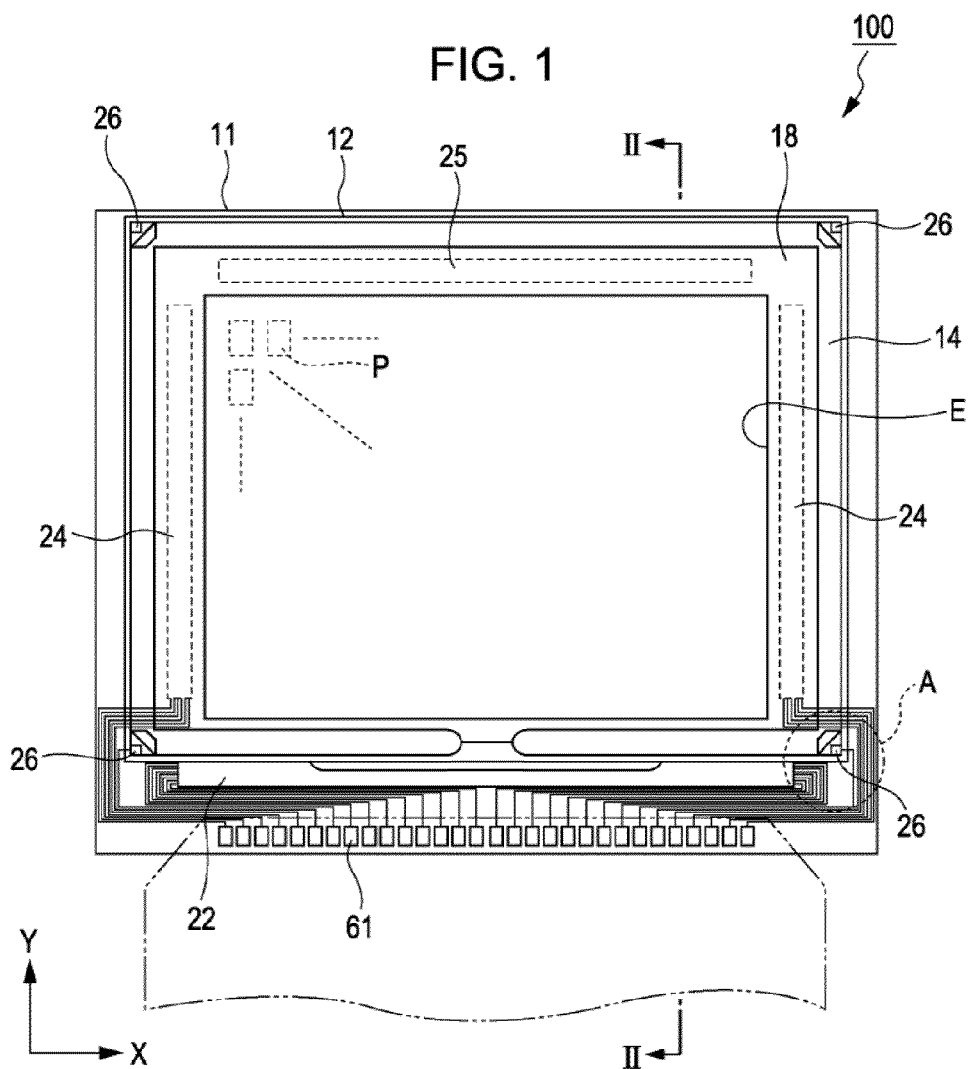
FIG. 1 is a schematic plan view illustrating the structure of a liquid crystal device as an electro-optical device.

An embodiment embodying an aspect of the invention will be described below with reference to the accompanying drawings. In the drawings used herein, parts or portions to be described are appropriately enlarged or reduced in size so that the parts or portions are recognizable.

In the following embodiment, for example, the phrase "on a substrate" refers to a state in which a component is disposed on a substrate so as to be in contact with it, in which a component is disposed on a substrate, with another component interposed therebetween, or in which a portion of a component is disposed on a substrate so as to be in contact with it and another portion of the component is disposed on the substrate, with another component interposed therebetween.

In the embodiment, an active matrix liquid crystal device including thin film transistors (TFTs) as switching elements for pixels will be described as an example of an electro-optical device. The liquid crystal device may preferably be used as, for example, a light modulator (liquid crystal light valve) of a projection display device (liquid crystal projector), which will be described below.

Structure of Electro-Optical Device

Figure 2:
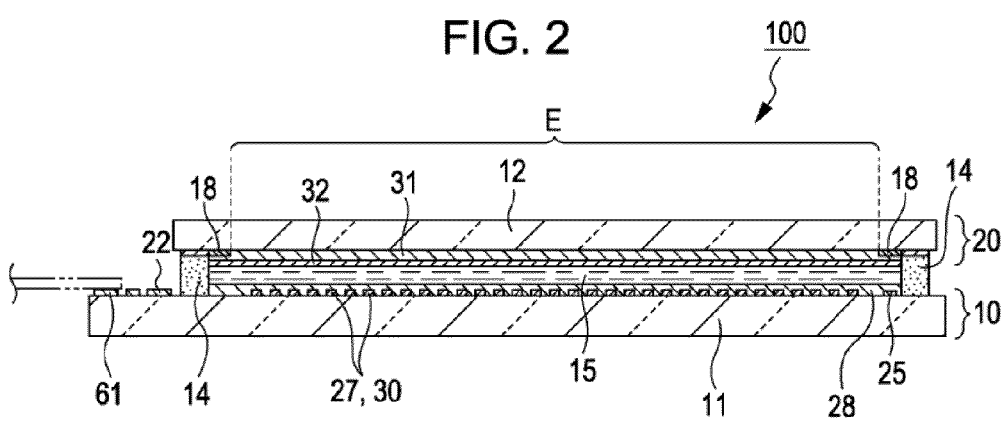
FIG. 2 is a schematic cross-sectional view of the liquid crystal device taken along line II-II of FIG. 1.
Figure 3:
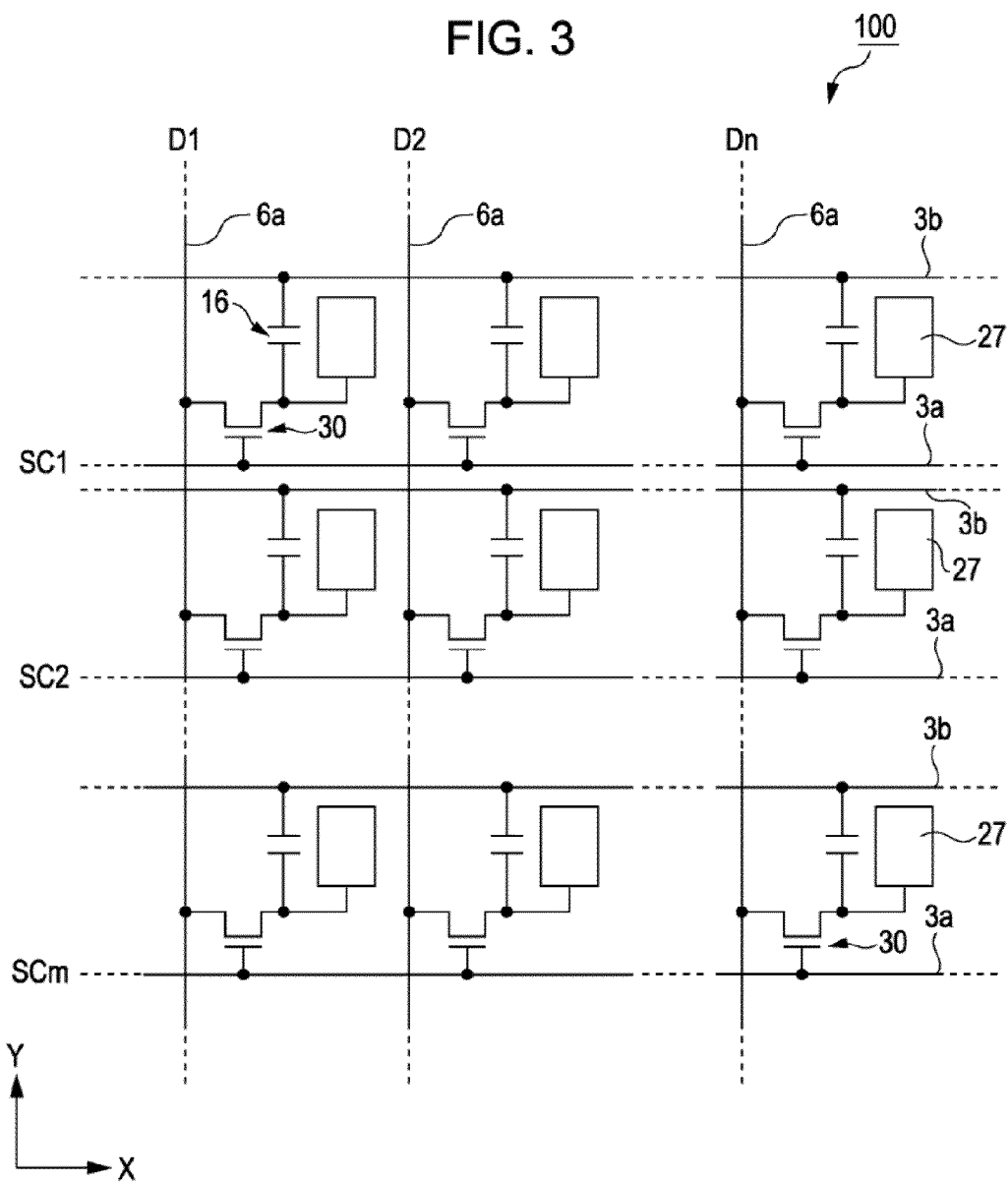
FIG. 3 is an equivalent circuit diagram illustrating the electrical structure of the liquid crystal device.
Figure 4:
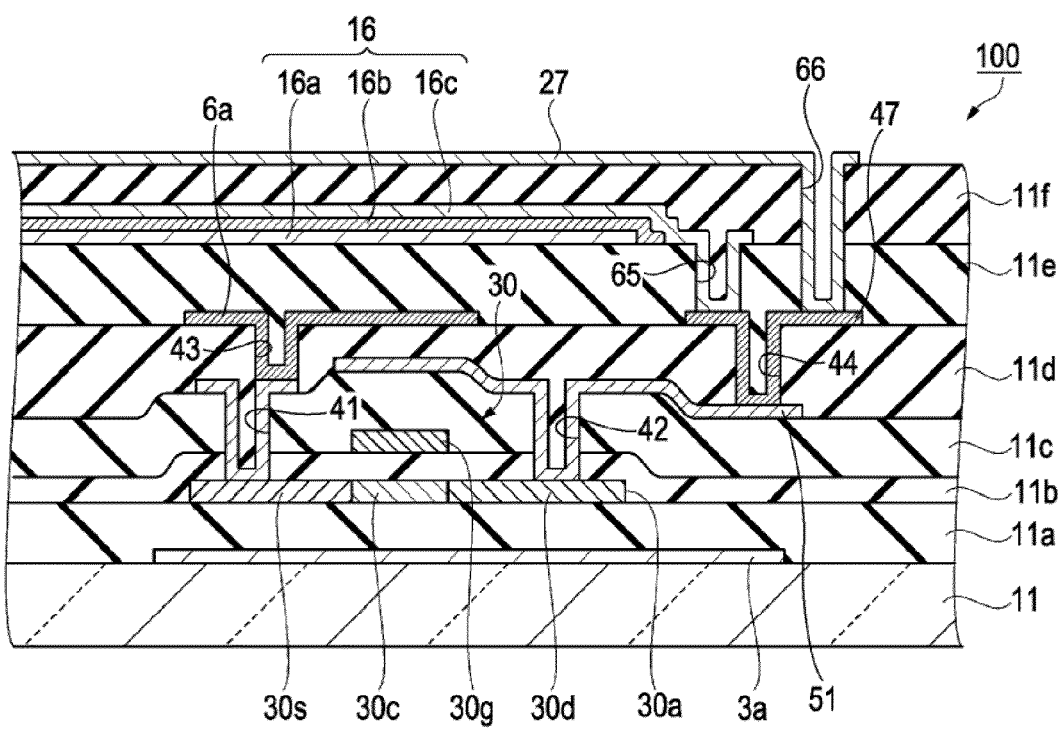
FIG. 4 is a schematic cross-sectional view illustrating the structure of the liquid crystal device.

FIG. 1 is a schematic plan view illustrating the structure of the liquid crystal device as the electro-optical device. FIG. 2 is a schematic cross-sectional view of the liquid crystal device taken along line II-II of FIG. 1. FIG. 3 is an equivalent circuit diagram illustrating the electrical structure of the liquid crystal device. FIG. 4 is a schematic cross-sectional view illustrating the structure of the liquid crystal device. The structure of the liquid crystal device will be described with reference to FIGS. 1 to 4.

As illustrated in FIGS. 1 and 2, a liquid crystal device 100 of the embodiment includes an element substrate 10 and a counter substrate 20 that are disposed opposite each other, and a liquid crystal layer 15 that is sandwiched between the pair of substrates. The element substrate 10 is constituted by a first substrate 11 and the counter substrate 20 is constituted by a second substrate 12. As the first and second substrates 11 and 12, for example, transparent substrates, such as glass substrates, or silicon substrates are used.

The element substrate 10 is slightly larger than the counter substrate 20. These substrates are bonded to each other with a sealing material 14 disposed in a frame shape therebetween. The gap therebetween is filled with liquid crystal with positive or negative dielectric anisotropy so as to form the liquid crystal layer 15. As the sealing material 14, for example, an adhesive, such as a thermosetting or ultraviolet curable epoxy resin, is employed. A gap material is contained in the sealing material 14 so as to keep a certain space between the pair of substrates.

On the counter substrate 20 side, a light shielding layer 18 is provided in a frame shape inside of the sealing material 14 disposed in a frame shape. The light shielding layer 18 is composed of, for example, a light shielding metal or metallic oxide. A display area E having a plurality of pixels P is formed inside of the light shielding layer 18. In the display area E as well, a light shielding section, which is not illustrated in FIG. 1, is provided so as to partition the plurality of pixels P in plan view.

A data line driving circuit 22 is provided between one edge portion of the first substrate 11 and the sealing material 14 along the one edge portion. An inspection circuit 25 is provided inside of the sealing material 14 along another edge portion opposite the one edge portion. Scanning line driving circuits 24 are provided inside of the sealing material 14 along the other two edge portions that are perpendicular to the one edge portion and that face each other. A plurality of wiring lines (not illustrated) that connect the two scanning line driving circuits 24 are provided inside of the sealing material 14 along the other edge portion opposite the one edge portion.

Wiring lines that are connected to the data line driving circuit 22 and the scanning line driving circuits 24 are connected to a plurality of external connection terminals 61 that are arranged along the one edge portion. Hereinafter, a direction along the one edge portion is defined as an X direction, and a direction along the other two edge portions that are perpendicular to the one edge portion and that face each other is defined as a Y direction. The arrangement of the inspection circuit 25 is not limited to this. The inspection circuit 25 may be provided at a position along the inside of the sealing material 14 between the data line driving circuit 22 and the display area E.

As illustrated in FIG. 2, on a surface of the first substrate 11 on the liquid crystal layer 15 side, there are formed pixel electrodes 27, thin film transistors 30 (hereinafter referred to as "TFTs 30") as switching elements, signal wiring lines, and an alignment film 28 that covers them. The pixel electrodes 27 and the TFTs 30 are provided for the pixels P and have optical transparency. In addition, a light shielding structure is employed that prevents light incident on semiconductor layers in the TFTs 30 from destabilizing a switching operation.

On a surface of the second substrate 12 on the liquid crystal layer 15 side, there are provided the light shielding layer 18, an interlayer insulating layer (not illustrated) that is formed so as to cover the light shielding layer 18, a common electrode 31 that is provided so as to cover the interlayer insulating layer, and an alignment film 32 that covers the common electrode 31.

As illustrated in FIG. 1, the light shielding layer 18 is provided in a frame shape at positions where it overlaps the scanning line driving circuits 24 and the inspection circuit 25 in plan view. This blocks light incident from the counter substrate 20 side so as to serve a function of preventing malfunction of peripheral circuitry including these driving circuits due to light. In addition, this prevents unnecessary stray light from entering the display area E so as to secure a high contrast display in the display area E.

The interlayer insulating layer is composed of, for example, an inorganic material, such as a silicon oxide, and has optical transparency. The interlayer insulating layer is provided so as to cover the light shielding layer 18. A method of forming such an interlayer insulating layer is a formation method using, for example, a plasma chemical vapor deposition (CVD) technique.

The common electrode 31 is composed of, for example, a transparent conductive film, such as an indium tin oxide (ITO), and covers the interlayer insulating layer. Also, as illustrated in FIG. 1, the common electrode 31 is electrically connected to wiring lines on the element substrate 10 side by vertical conductive portions 26 that are provided at the four corners of the counter substrate 20.

The alignment film 28, which covers the pixel electrodes 27, and the alignment film 32, which covers the common electrode 31, are selected in accordance with the optical design of the liquid crystal device 100. An example of such alignment films is a film of an inorganic material, such as a silicon oxide (SiOx). The film is formed by using a vapor deposition technique so as to provide substantially vertical alignment with respect to liquid crystal molecules.

As illustrated in FIG. 3, the liquid crystal device 100 has a plurality of scanning lines 3a and a plurality of data lines 6a, which are insulated from each other and intersect at right angles in at least the display area E, and capacitor lines 3b. A direction in which the scanning lines 3a extend is defined as an X direction, and a direction in which the data lines 6a extend is defined as a Y direction.

The pixel electrodes 27, the TFTs 30, and capacitor elements 16 are provided in regions divided by the scanning lines 3a, the data lines 6a, the capacitor lines 3b, and signal lines thereof. The pixel electrodes 27, TFTs 30, and capacitor elements 16 constitute pixel circuits of the pixels P.

The scanning lines 3a are electrically connected to gates of the TFTs 30, and the data lines 6a are electrically connected to data-line-side source/drain regions of the TFTs 30. The pixel electrodes 27 are electrically connected to pixel-electrode-side source/drain regions of the TFTs 30.

The data lines 6a are connected to the data line driving circuit 22 (see FIG. 1) and supply image signals D1, D2, ..., and Dn, which are supplied from the data line driving circuit 22, to the pixels P. The scanning lines 3a are connected to the scanning line driving circuits 24 (see FIG. 1) and supply scanning signals SC1, SC2, ..., and SCm, which are supplied from the scanning line driving circuits 24, to the pixels P.

The image signals D1 to Dn from the data line driving circuit 22 may be line-sequentially supplied in this order to the data lines 6a, or may be supplied to each group of the data lines 6a which are adjacent to one another. The scanning line driving circuits 24 line-sequentially supply the scanning signals SC1 to SCm to the scanning lines 3a in the form of pulses at a predetermined timing.

In the liquid crystal device 100, the TFTs 30, which are switching elements, are set to an ON state for only a certain period of time by input of the scanning signals SC1 to SCm, so that the image signals D1 to Dn supplied from the data lines 6a are written into the pixel electrodes 27 at a predetermined timing. The image signals D1 to Dn at a predetermined level written into the liquid crystal layer 15 via the pixel electrodes 27 are held, for a certain period of time, between the pixel electrodes 27 and the common electrode 31 that are disposed opposite each other, with the liquid crystal layer 15 interposed therebetween.

In order to prevent leakage of the held image signals D1 to Dn, the capacitor elements 16 are connected in parallel with liquid crystal capacitors formed between the pixel electrodes 27 and the common electrode 31. The capacitor elements 16 are provided between the pixel-electrode-side source/drain regions of the TFTs 30 and the capacitor lines 3b. The capacitor elements 16 have dielectric layers between capacitor electrodes composed of transparent conductive films and the pixel electrodes 27.

In the liquid crystal device 100 of, for example, a transmissive type, an optical design of a normally white mode, in which bright display is performed when the pixels P are not driven, or a normally black mode, in which dark display is performed when the pixels P are not driven, is employed. The liquid crystal device 100 in which polarizing elements are respectively disposed on light incidence and emission sides in accordance with the optical design is employed.

Next, the structure of each pixel P will be described in more detail with reference to FIG. 4. As illustrated in FIG. 4, the scanning line 3a is provided on the first substrate 11. The scanning line 3a has light shielding properties, and may be composed of, for example, a single metal such as aluminum (Al), titanium (Ti), chromium (Cr), tungsten (W), tantalum (Ta), or molybdenum (Mo), or an alloy, metal silicide, polysilicide, or nitride that contains at least one of these metals. The scanning line 3a may be a laminate composed of any of these materials.

The scanning line 3a is disposed below a semiconductor layer 30a. Thus, a channel region 30c of the TFT 30 may be substantially or completely shielded from light of a liquid crystal projector or the like by forming the scanning line 3a which is wider than the semiconductor layer 30a of the TFT 30. As a result, when the liquid crystal device 100 is operated, light leakage current in the TFT 30 is reduced, thereby improving a contrast ratio and making high-quality image display possible.

A base insulating layer 11a composed of, for example, a silicon oxide that constitutes a second insulating film is provided on the scanning line 3a so as to cover the first substrate 11 and the scanning line 3a. The semiconductor layer 30a is provided in an island shape on the base insulating layer 11a.

The semiconductor layer 30a is composed of, for example, a polycrystalline silicon film, and impurity ions are implanted therein, so that the semiconductor layer 30a has a data-line-side source/drain region 30s, the channel region 30c, and a pixel-electrode-side source/drain region 30d.

A first interlayer insulating layer (gate insulating layer) 11b that constitutes the second insulating film is formed on the semiconductor layer 30a so as to cover the semiconductor layer 30a and the base insulating layer 11a. A gate electrode 30g is provided at a position opposite the channel region 30c, with the first interlayer insulating layer 11b interposed therebetween.

A second interlayer insulating layer 11c that constitutes a first insulating film is provided on the gate electrode 30g so as to cover the gate electrode 30g and the first interlayer insulating layer 11b. Two contact holes CNT 41 and CNT 42 that extend through the first interlayer insulating layer 11b and the second interlayer insulating layer 11c are provided at positions where they overlap the ends of the semiconductor layer 30a in plan view.

Specifically, a conductive film of a light shielding conductive material, such as aluminum (Al), is formed so as to fill the contact hole CNT 41 and the contact hole CNT 42 and to cover the second interlayer insulating layer 11c. The conductive film is subjected to patterning so as to form the contact hole CNT 41, the contact hole CNT 42, and a relay layer 51 that is connected to the pixel-electrode-side source/drain region 30d via the contact hole CNT 42.

The relay layer 51 shields the TFT 30 from light together with the data line 6a, which will be described below. The relay layer 51 partially and electrically connects the TFT 30 and the pixel electrode 27.

A third interlayer insulating layer 11d that constitutes the first insulating film is provided on the relay layer 51 so as to cover the relay layer 51 and the second interlayer insulating layer 11c. In the third interlayer insulating layer 11d, in plan view, a contact hole CNT 43 is provided so as to overlap a portion of the contact hole CNT 41, and a contact hole CNT 44 is provided so as to overlap a portion of the relay layer 51.

Specifically, a conductive film of a light shielding conductive material, such as aluminum (Al), is formed so as to fill the contact holes CNT 43 and CNT 44 and to cover the third interlayer insulating layer 11d. The conductive film is subjected to patterning so as to form the data line 6a, the contact holes CNT 43 and CNT 44, and a relay electrode 47.

A fourth interlayer insulating layer 11e is provided on the data line 6a and the relay electrode 47 so as to cover the data line 6a, the relay electrode 47, and the third interlayer insulating layer 11d. The fourth interlayer insulating layer 11e is composed of, for example, a silicon oxide or nitride, and is subjected to a planarization process to planarize an uneven surface caused by covering the TFT 30 and so forth. Examples of the planarization process technique include a chemical mechanical polishing (CMP) process and a spin coating process.

A first capacitor electrode 16a composed of an ITO film or the like that constitutes the capacitor element 16 is formed on the fourth interlayer insulating layer 11e through a patterning process. A translucent dielectric layer 16b that constitutes the capacitor element 16 is deposited on the first capacitor electrode 16a through a patterning process.

As the dielectric layer 16b, a silicon compound, such as a silicon oxide film or a silicon nitride film, may be used. In addition, a dielectric layer with a high dielectric constant, such as an aluminum oxide film, a titanium oxide film, a tantalum oxide film, a niobium oxide film, a hafnium oxide film, a lanthanum oxide film, or a zirconium oxide film, may be used.

A second capacitor electrode 16c composed of an ITO film or the like that constitutes the capacitor element 16 is deposited on the dielectric layer 16b through a patterning process. The second capacitor electrode 16c is disposed so as to overlap the first capacitor electrode 16a, with the dielectric layer 16b interposed therebetween. The second capacitor electrode 16c constitutes the capacitor element 16 together with the first capacitor electrode 16a and the dielectric layer 16b.

An end of the second capacitor electrode 16c overlaps a portion of the relay electrode 47 in plan view, and is electrically connected to an extended portion of the relay electrode 47 via a contact hole CNT 65 provided in the fourth interlayer insulating layer 11e.

A fifth interlayer insulating layer 11f is provided on the second capacitor electrode 16c so as to cover the second capacitor electrode 16c and the fourth interlayer insulating layer 11e. The fifth interlayer insulating layer 11f is composed of, for example, a silicon oxide or nitride, and is subjected to a planarization process to planarize an uneven surface caused by covering wiring lines, electrodes and so forth.

The pixel electrode 27 composed of an ITO film or the like is provided on the fifth interlayer insulating layer 11f. The pixel electrode 27 is electrically connected to an extended portion of the relay electrode 47 via a contact hole CNT 66 that is provided in the fifth interlayer insulating layer 11f and the fourth interlayer insulating layer 11e.

In this way, the pixel electrode 27 and the second capacitor electrode 16c are electrically connected to the pixel-electrode-side source/drain region 30d of the TFT 30 via the relay electrode 47, the contact hole CNT 44, the relay layer 51 and the contact hole CNT 42.

The alignment film 28 (see FIG. 2) is provided on the surface of the pixel electrode 27. The alignment film 28 is composed of, for example, an obliquely deposited film, such as a silicon oxide film. In the embodiment, the alignment film 28 is an inorganic alignment film (vertical alignment film) composed of an obliquely deposited film of, for example, $SiO_x$ (x<2), $SiO_2$, $TiO_2$, $MgO$, $Al_2O_3$, $In_2O_3$, $Sb_2O_3$, or $Ta_2O_5$.

Figure 5:
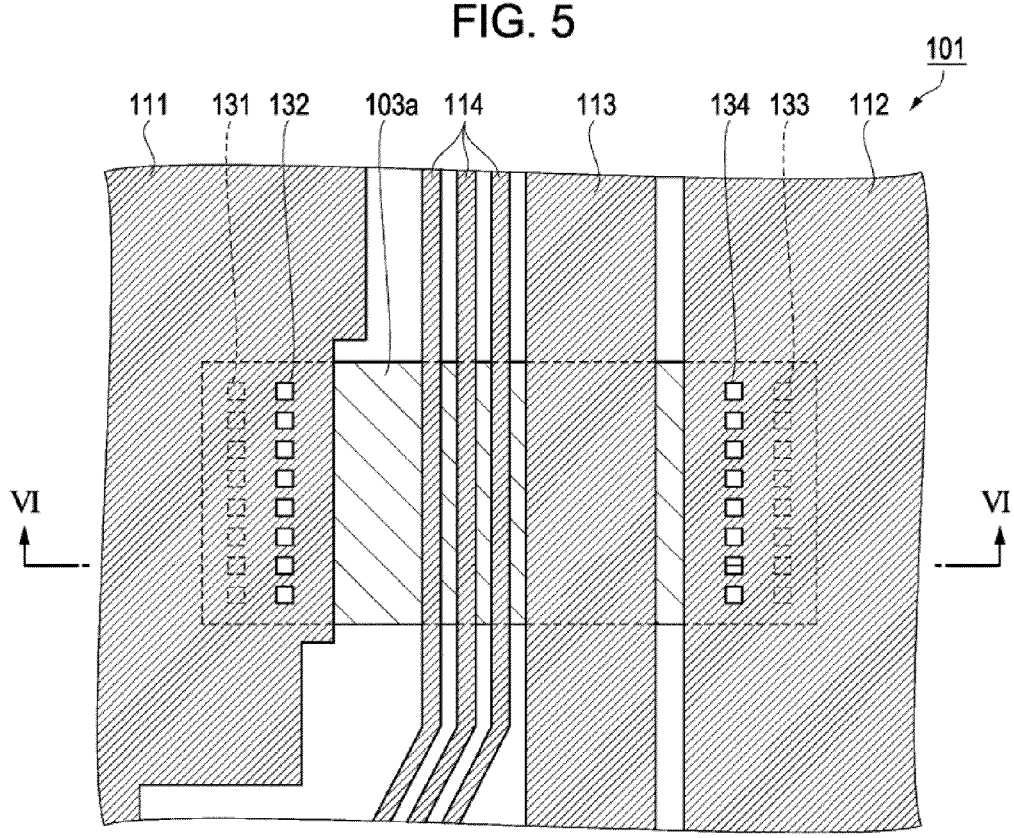
FIG. 5 is a schematic plan view illustrating the structure of part of peripheral circuitry in the liquid crystal device.
Figure 6:
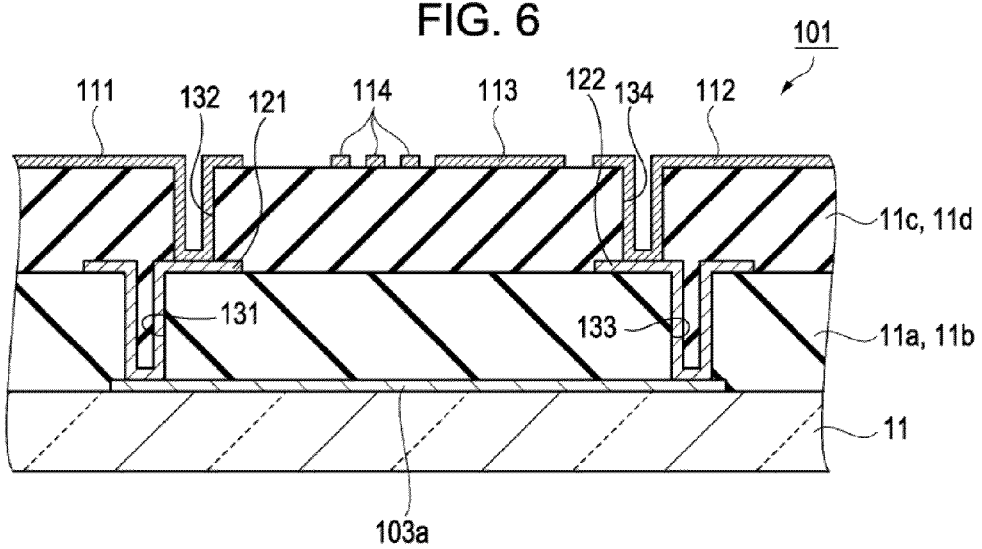
FIG. 6 is a schematic cross-sectional view of the peripheral circuitry taken along line VI-VI of FIG. 5.

FIG. 5 is a schematic plan view illustrating the structure of part of peripheral circuitry in the liquid crystal device. FIG. 6 is a schematic cross-sectional view of the peripheral circuitry taken along line VI-VI of FIG. 5. The structure of the peripheral circuitry will be described below with reference to FIGS. 5 and 6.

Peripheral circuitry 101 is provided, for example, in the vicinity of a portion A of the liquid crystal device 100 illustrated in FIG. 1. Specifically, as illustrated in FIG. 5, the peripheral circuitry 101 has, for example, a first VDD power supply wiring line 111 as a first power supply wiring line connected to the data line driving circuit 22, a second VDD power supply wiring line 112 as a second power supply wiring line connected to the scanning line driving circuit 24, a VSS power supply wiring line 113 and signal wiring lines 114.

These wiring lines are, for example, power supply wiring lines that are connected to the external connection terminals 61. Most of these wiring lines have larger planar areas than other wiring lines, and also have larger amounts of electric charges than the other wiring lines. Transistors and so forth, which are not illustrated, are connected to the first VDD power supply wiring line 111 and the second VDD power supply wiring line 112.

As illustrated in FIG. 6, the first VDD power supply wiring line 111 and the second VDD power supply wiring line 112 are electrically connected to each other via a contact hole CNT 132 (first contact hole), a first electrical conductor 121, a contact hole CNT 131 (second contact hole), a wiring line 103a which also serves as the scanning line 3a, a contact hole CNT 133 (second contact hole), a second electrical conductor 122, and a contact hole CNT 134 (first contact hole). That is, the first VDD power supply wiring line 111 and the second VDD power supply wiring line 112 are electrically connected to each other in an integrated manner via the electrical conductors 121 and 122, the wiring line 103a, and so forth. The contact holes CNT 131 to CNT 134 partially constitute the electrical conductors.

Specifically, as described above, the wiring line 103a is provided on the first substrate 11. The wiring line 103a is formed of the same film as the scanning line 3a, and therefore is constituted by a light shielding film having light shielding properties like the scanning line 3a. The base insulating layer 11a and the first interlayer insulating layer 11b are provided, in sequence, on the wiring line 103a so as to cover the wiring line 103a and the first substrate 11.

The first electrical conductor 121 and the second electrical conductor 122 are provided on the first interlayer insulating layer 11b. The first electrical conductor 121 and the second electrical conductor 122 are formed of the same film as the foregoing gate electrode 30g. The first electrical conductor 121 is electrically connected to an end of the wiring line 103a via the contact hole CNT 131. The second electrical conductor 122 is electrically connected to an end of the wiring line 103a via the contact hole CNT 133.

The second interlayer insulating layer 11c and the third interlayer insulating layer 11d are provided, in sequence, on the first electrical conductor 121 and the second electrical conductor 122 so as to cover the electrical conductors 121 and 122 and the first interlayer insulating layer 11b. The first VDD power supply wiring line 111, the second VDD power supply wiring line 112, the VSS power supply wiring line 113, the signal wiring lines 114, and so forth are provided on the third interlayer insulating layer 11d. These wiring lines are formed of the same film as the foregoing data line 6a.

The first VDD power supply wiring line 111 is electrically connected to the first electrical conductor 121 via the contact hole CNT 132 that extends through the second interlayer insulating layer 11c and the third interlayer insulating layer 11d. The second VDD power supply wiring line 112 is electrically connected to the second electrical conductor 122 via the contact hole CNT 134 that extends through the second interlayer insulating layer 11c and the third interlayer insulating layer 11d.

As described above, the first VDD power supply wiring line 111 and the second VDD power supply wiring line 112, which have particularly large areas, are electrically connected to each other in an integrated manner via the first electrical conductor 121, the wiring line 103a, the second electrical conductor 122, and the contact holes CNT 131 to CNT 134.

In this way, the first VDD power supply wiring line 111 and the second VDD power supply wiring line 112 are connected to each other via the electrical conductors 121 and 122, which are provided on the layer below the first VDD power supply wiring line 111 and the second VDD power supply wiring line 112, and also the wiring line 103a, which is provided on the layer below the electrical conductors 121 and 122, so that paths to let static electricity escape, which is accumulated in the power supply wiring lines 111 and 112, and so forth in a manufacturing process, may be provided.

Specifically, when patterning (especially, shading) of the first VDD power supply wiring line 111, the second VDD power supply wiring line 112, the VSS power supply wiring line 113, the signal wiring lines 114, and so forth is performed, static electricity is generated. When the static electricity is concentrated in, especially, fine portions of the wiring lines, electrostatic damage of the wiring lines and the transistors may be caused. This creates a problem, such as a decrease in the product yield or the product reliability.

However, the power supply wiring lines 111 and 112 are electrically connected to each other in an integrated manner via a common wiring line including the electrical conductors 121 and 122, the wiring line 103a and so forth. Also, the power supply wiring lines 111 and 112 are connected to each other via the redundant common wiring line. Hence, for example, even if static electricity is generated when patterning is performed in a manufacturing process, concentration of electric charges may be reduced by causing electric charges to pass through the common wiring line before electric charges are concentrated and thereby damage wiring lines and so forth. In other words, the electric charges may be dispersed. As a result, failure, such as electrostatic damage of the wiring lines and the transistors, may be suppressed.

The electrical conductors 121 and 122 perform a relay function between the power supply wiring lines 111 and 112, and also serve as added resistors for an inrush of static electricity. The connection resistance of the contact holes CNT 131 and CNT 133, which are close to the wiring line 103a, is desirably higher than that of the contact holes CNT 132 and CNT 134. Hence, inrushes of electric charges may be reduced further.

Because the power supply wiring lines 111 and 112 are connected to the wiring line 103a, which is provided on the still lower layer, via the electrical conductors 121 and 122, the distance between the power supply wiring lines 111 and 112, which are metal wiring lines, and the wiring line 103a may be increased. Thus, such a problem that concentration of electric charges cannot be reduced in the case where the distance between the power supply wiring lines 111 and 112 and the wiring line 103a is small may be suppressed. In addition, the occurrence of damage of an insulating film or the like may be suppressed.

The electrical conductors 121 and 122 have, for example, a laminated structure including a tungsten silicide film and a polysilicon film. Each film is, for example, 100 nm in thickness. The wiring line 103a is composed of, for example, a tungsten silicide, and is, for example, 200 nm in thickness.

The first VDD power supply wiring line 111, the second VDD power supply wiring line 112, the VSS power supply wiring line 113, and so forth have, for example, a four-layer structure including titanium (Ti), a titanium nitride (TiN), an alloy film of aluminum (Al), silicon (Si), and copper (Cu), and a titanium nitride (TiN).

Structure of Electronic Apparatus

Figure 7:
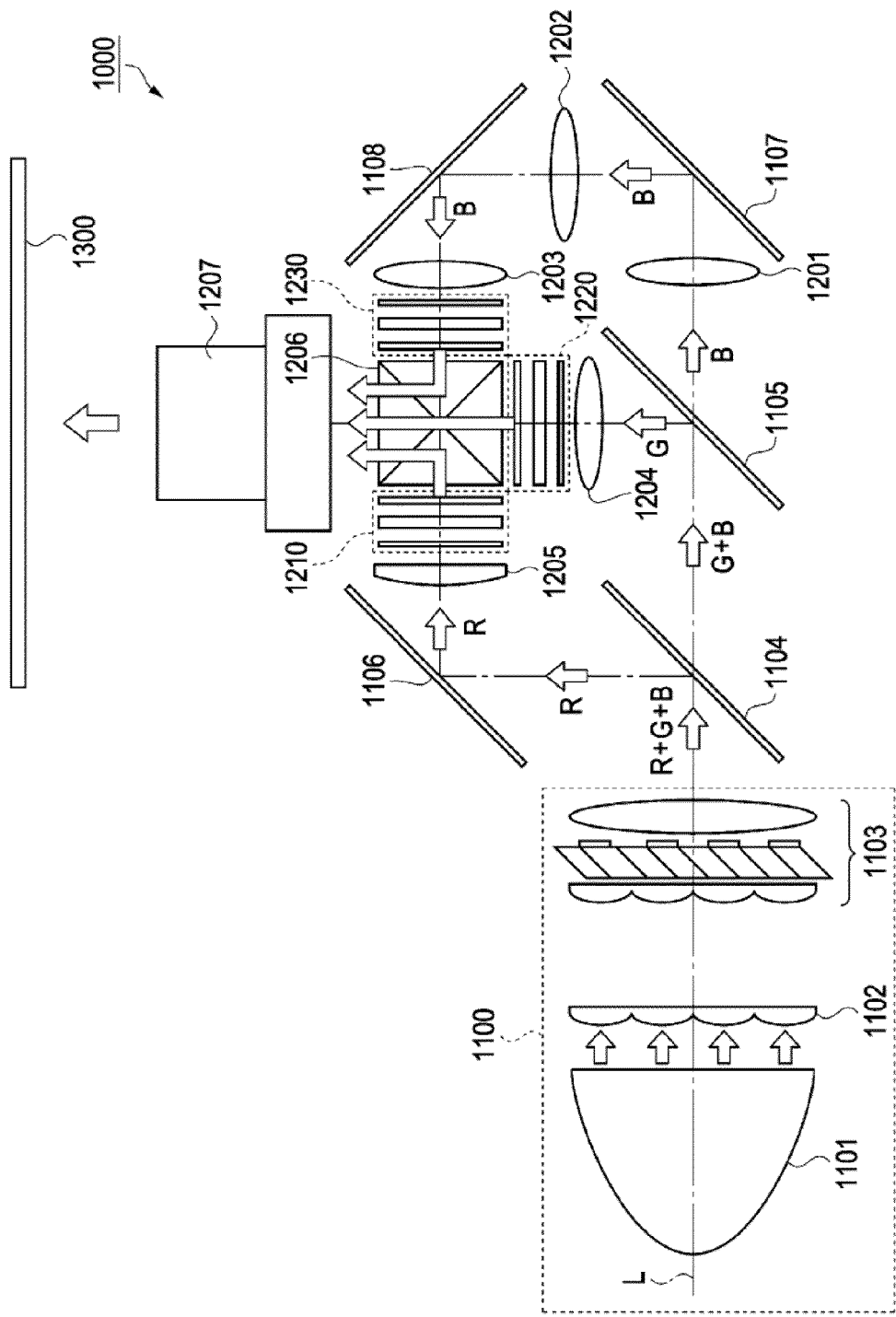
FIG. 7 is a schematic view illustrating the structure of a projection display device (projector) as an electronic apparatus including the electro-optical device.

FIG. 7 is a schematic view illustrating the structure of the projection display device as an electronic apparatus including the foregoing liquid crystal device. The structure of the projection display device including the liquid crystal device will be described below with reference to FIG. 7.

As illustrated in FIG. 7, a projection display device 1000 as the electronic apparatus of the embodiment includes a polarized light illumination device 1100 disposed along a system optical axis L, two dichroic mirrors 1104 and 1105 as light separating elements, three reflecting mirrors 1106, 1107, and 1108, five relay lenses 1201, 1202, 1203, 1204, and 1205, three transmissive liquid crystal light valves 1210, 1220, and 1230 as light modulators, a cross dichroic prism 1206 as a light combining element, and a projection lens 1207.

The polarized light illumination device 1100 includes a lamp unit 1101 as a light source composed of a white light source, such as an ultra-high pressure mercury lamp or a halogen lamp, an integrator lens 1102, and a polarization conversion element 1103.

The dichroic mirror 1104 reflects a red light component (R) of a polarized light beam emitted from the polarized light illumination device 1100, and transmits a green light component (G) and a blue light component (B) thereof. The other dichroic mirror 1105 reflects the green light component (G) transmitted through the dichroic mirror 1104, and transmits the blue light component (B).

The red light component (R) reflected by the dichroic mirror 1104 is reflected by the reflecting mirror 1106, and then enters the liquid crystal light valve 1210 via the relay lens 1205. The green light component (G) reflected by the dichroic mirror 1105 enters the liquid crystal light valve 1220 via the relay lens 1204. The blue light component (B) transmitted through the dichroic mirror 1105 enters the liquid crystal light valve 1230 via a light guide system composed of the three relay lenses 1201, 1202, and 1203, and the two reflecting mirrors 1107 and 1108.

The liquid crystal light valves 1210, 1220, and 1230 are respectively disposed opposite incidence planes of the cross dichroic prism 1206 corresponding to each of color light components. The color light components having entered the liquid crystal light valves 1210, 1220, and 1230 are modulated on the basis of video information (video signal), and are emitted toward the cross dichroic prism 1206. This prism has four rectangular prisms adhered together. Inside the prism, a dielectric multilayer film that reflects a red light component and a dielectric multilayer film that reflects a blue light component are formed in a cross shape. The three color light components are combined by these dielectric multilayer films, so that light to express a color image is produced. The combined light is projected onto a screen 1300 by the projection lens 1207, which is a projection optical system, so as to display an enlarged image.

In the liquid crystal light valve 1210, the foregoing liquid crystal device 100 is used. The liquid crystal device 100 is disposed between a pair of polarizing elements, which are disposed in a crossed Nichol state on color light component incidence and emission sides, with gaps provided therebetween. The same applies in the other liquid crystal light valves 1220 and 1230.

According to the projection display device 1000, the use of a liquid crystal module including the liquid crystal device 100 may provide an electronic apparatus that allows improvement in the reliability of the quality thereof to be achieved.

As described above in detail, according to the liquid crystal device 100 and the electronic apparatus of the embodiment, the following effects are obtained.

(1) According to the liquid crystal device 100 of the embodiment, the first VDD power supply wiring line 111 and the second VDD power supply wiring line 112 are electrically connected to each other in an integrated manner via the first electrical conductor 121, the second electrical conductor 122, the wiring line 103a, and the contact holes CNT 131 to CNT 134, which are provided on/in the layers below the first VDD power supply wiring line 111 and the second VDD power supply wiring line 112, and which constitute a common wiring line. Thus, even if static electricity is generated when patterning of transistors, wiring lines, and so forth which are connected to the power supply wiring lines 111 and 112 is performed, electric charges may pass through the common wiring line, through which the power supply wiring lines 111 and 112 are redundantly routed, so that the static electricity may be prevented from being concentrated in a portion. Hence, the amount of static electricity is reduced, so that electrostatic damage of the transistors and the wiring lines, which are connected to the power supply wiring lines 111 and 112 to which power is supplied, may be suppressed. In addition, the electrical conductors 121 and 122 may be used as inrush resistors and thereby may consume electric charges.

(2) According to the electronic apparatus of the embodiment, because the electronic apparatus includes the foregoing liquid crystal device 100, the transistors and the wiring lines, which are connected to the power supply wiring lines 111 and 112 provided in the peripheral circuitry 101, may be protected from static electricity, so that the electronic apparatus that allows improvement in the reliability and the yield thereof to be achieved may be provided.

Aspects of the invention are not limited to the above embodiment, and can be appropriately modified without departing from the gist or spirit of the aspect of the invention known through the claims and the whole specification. Such modifications are included in the technical scope of the aspect of the invention. In addition, the following modifications may be implemented.

First Modification

The structure of the electro-optical device is not limited to that of the foregoing liquid crystal device 100. As long as an electro-optical device includes power supply wiring lines, a first electrical conductor, a second electrical conductor, and a wiring line, and as long as the first electrical conductor, the second electrical conductor, and the wiring line are provided on layers below the power supply wiring lines, such a structure may be applied to an electro-optical device having another structure.

Second Modification

As described above, the first VDD power supply wiring line 111 and the second VDD power supply wiring line 112 are electrically connected to each other in an integrated manner (maintained at the same potential) by the common wiring line (contact hole, electrical conductor, and wiring line). Aspects of the invention are not limited to this. Other power supply wiring lines may be electrically connected to each other in an integrated manner. For example, a VSS power supply wiring line connected to the data line driving circuit 22 and a VSS power supply wiring line connected to the scanning line driving circuit 24 may be electrically connected to each other in an integrated manner using the common wiring line.

Third Modification

The foregoing electro-optical device is not limited to the liquid crystal device 100. Examples of the electro-optical device may include display devices, such as an organic electroluminescence (EL) device and an electrophoresis apparatus. Also, examples of the electro-optical device may include a reflective liquid crystal device (LCOS), a plasma display (PDP), a field emission display (FED, SED or the like), and a digital micromirror device (DMD).

Fourth Modification

In the above-described embodiment, the projection display device 1000 (projector) is taken as an example of the electronic apparatus. However, the electronic apparatus is not limited to this. Examples of the electronic apparatus may include a viewer, a view finder, a head mounted display, and the like. Also, examples of the electronic apparatus may include various types of electronic apparatuses, such as a liquid crystal television, a mobile phone, an electronic organizer, a word processor, a view finder-type or monitor direct-view-type video tape recorder, a workstation, a mobile personal computer, a video phone, a POS terminal, a pager, an electronic calculator, and a touch panel, an electrophoresis apparatus, such as an electronic paper, a car navigation device, and the like.

What is claimed is:

1. An electro-optical device comprising:
   a substrate;
   a wiring disposed above the substrate;
   a first insulation layer disposed above the wiring;
   a second insulation layer disposed above the first insulation layer;
   a first power supply line disposed above the second insulation layer;
   a second power supply line disposed above the second insulation layer;
   a first contact hole disposed in the first insulation layer;
   a second contact hole disposed in the first insulation layer;
   a third contact hole disposed in the second insulation layer;
   a fourth contact hole disposed in the second insulation layer;
   a first electrical conductor disposed in the first contact hole;
   a second electrical conductor disposed in the second contact hole;
   a third electrical conductor disposed in the third contact hole; and
   a fourth electrical conductor disposed in the fourth contact hole,
   wherein the first power supply line electrically connects the wiring via the first electrical conductor and the third electrical conductor, and
   the second power supply line electrically connects the wiring via the second electrical conductor and the fourth electrical conductor.

2. The electro-optical device according to claim 1, wherein connection resistance of the third contact hole is higher than connection resistance of the first contact hole.

3. The electro-optical device according to claim 1, wherein a layer of a gate electrode is the first insulation layer.

4. The electro-optical device according to claim 1, further comprising:
   a plurality of transistors, one of the plurality of transistors being disposed so as to correspond to one of a plurality of pixel portions; and
   a light shielding film that shields the one of the plurality of transistors from light, a layer of the wiring being a layer of the light shielding film.

5. The electro-optical device according to claim 1, wherein a first layer of the first power supply line and the second power supply line is a layer of a data line.

6. An electronic apparatus comprising the electro-optical device according to claim 1.

* * * * *